United States Patent
Nazarpoor et al.

(10) Patent No.: US 9,486,783 B2
(45) Date of Patent: Nov. 8, 2016

(54) SYSTEMS AND METHODS FOR USING COPPER-MANGANESE SPINEL AS ACTIVE PHASE FOR DIESEL OXIDATION APPLICATIONS

(71) Applicant: Clean Diesel Technologies Inc., Oxnard, CA (US)

(72) Inventors: Zahra Nazarpoor, Camarillo, CA (US); Stephen J. Golden, Santa Barbara, CA (US)

(73) Assignee: Clean Diesel Technologies, Inc. (CDTI), Oxnard, CA (US)

( * ) Notice: Subject to any disclaimer, the term of this patent is extended or adjusted under 35 U.S.C. 154(b) by 144 days.

(21) Appl. No.: 14/251,186

(22) Filed: Apr. 11, 2014

(65) Prior Publication Data

US 2015/0290627 A1     Oct. 15, 2015

(51) Int. Cl.
| | |
|---|---|
| *B01J 23/83* | (2006.01) |
| *B01J 23/889* | (2006.01) |
| *B01D 53/94* | (2006.01) |
| *B01J 23/00* | (2006.01) |
| *B01J 23/66* | (2006.01) |
| *B01J 23/68* | (2006.01) |
| *B01J 37/02* | (2006.01) |

(52) U.S. Cl.
CPC .......... *B01J 23/8892* (2013.01); *B01D 53/944* (2013.01); *B01D 53/945* (2013.01); *B01J 23/002* (2013.01); *B01J 23/005* (2013.01); *B01J 23/66* (2013.01); *B01J 23/688* (2013.01); *B01J 23/83* (2013.01); *B01D 2255/104* (2013.01); *B01D 2255/206* (2013.01); *B01D 2255/2061* (2013.01); *B01D 2255/2063* (2013.01); *B01D 2255/2065* (2013.01); *B01D 2255/2066* (2013.01); *B01D 2255/2068* (2013.01); *B01D 2255/20715* (2013.01); *B01D 2255/20761* (2013.01); *B01D 2255/65* (2013.01); *B01D 2255/908* (2013.01); *B01D 2255/9022* (2013.01); *B01J 37/0244* (2013.01); *B01J 37/0246* (2013.01); *Y02T 10/22* (2013.01); *Y10S 502/52712* (2013.01)

(58) Field of Classification Search
CPC   B01J 23/005; B01J 23/6562; B01J 23/8892; B01J 23/002; B01J 23/83; B01J 37/0244; B01J 37/0246; Y10S 502/524; Y10S 502/5712
USPC .................................................. 502/324, 524
See application file for complete search history.

(56) References Cited

U.S. PATENT DOCUMENTS

| | | | | |
|---|---|---|---|---|
| 2006/0120936 | A1* | 6/2006 | Alive ................... | B01D 53/944 423/215.5 |
| 2009/0324469 | A1* | 12/2009 | Golden ................ | B01D 53/945 423/212 |
| 2015/0148215 | A1* | 5/2015 | Nazarpoor ........... | B01J 23/8892 502/66 |

*Primary Examiner* — Patricia L Hailey
(74) *Attorney, Agent, or Firm* — Alston & Bird LLP

(57) ABSTRACT

A diesel oxidation catalyst (DOC) system for the treatment of exhaust gas emissions, including oxidation of nitrogen oxides (NO), unburned hydrocarbons (HC), and carbon monoxide (CO) is disclosed. Fresh and hydrothermally aged Zero-PGM (ZPGM) DOC samples are prepared and configured with an alumina-based washcoat on ceramic substrate, overcoat including doped Zirconia support oxide, and impregnation layer of Cu—Mn spinel of selected base metal loadings. Testing of fresh and hydrothermally aged ZPGM DOC system samples including Cu—Mn spinel is developed to evaluate the performance of Cu—Mn spinel active phase in oxidation CO, HC, and NO, as well as production of $NO_2$. Key to improvement in light-off performance and NO oxidation is to have a diesel oxidation catalyst that is substantially PGM-free and available for a plurality of applications in lean burn engine operations.

21 Claims, 4 Drawing Sheets

SYSTEMS AND METHODS FOR USING COPPER-MANGANESE SPINEL AS ACTIVE PHASE FOR DIESEL OXIDATION APPLICATIONS

CROSS-REFERENCE TO RELATED APPLICATIONS

This application is related to U.S. patent application Ser. No. 13/849,169, filed Mar. 22, 2013, entitled Methods for Oxidation and Two-way and Three-way ZPGM Catalyst Systems and Apparatus Comprising Same.

BACKGROUND

1. Field of the Disclosure

This disclosure relates generally to catalyst materials, and more particularly to a catalytically active material composition including a copper-manganese spinel structure as catalytically active component, and to a diesel oxidation catalyst including this catalytically active component.

2. Background Information

Operation of diesel engines and lean burn gasoline engines provide users with fuel economy and have very low emissions of gas phase hydrocarbons and carbon monoxide due to their operation at high air/fuel ratios under fuel lean conditions. The exhaust gas of diesel engines typically includes carbon monoxide (CO), hydrocarbons (HC), and nitrogen oxides ($NO_X$), and a relatively high oxygen content of up to 15% by volume. In addition, particulate emissions of solid soot residues, i.e., volatile organic fractions (VOF) or soluble organic fractions (SOF), originate from partially incomplete fuel combustion in the engine cylinders. The CO and HC pollutant gases may be rendered harmless by oxidation over a suitable oxidation catalyst. NO is of concern because it is believed to undergo a process known as photo-chemical smog formation, through a series of reactions in the presence of sunlight and hydrocarbons. As engine improvements are made to reduce particulates and unburned hydrocarbons on diesel engines, the $NO_X$ emissions tend to increase.

Diesel oxidation catalysts (DOC) for removal of carbon monoxide (CO), gaseous hydrocarbons (HC) and any VOF have been known and largely described in current art. Usually, platinum group metals (PGM) are used alone or in combination with other noble metals as active components in oxidation catalysts. Their ratio depends on the configuration of the exhaust gas system in which the catalyst is to be used, but noble metals catalyze different oxidation reactions in the catalyst system with different effectiveness.

Platinum (Pt) remains the most effective platinum group metal for oxidizing CO and HC in a DOC, after high temperature aging under lean conditions and in the presence of fuel sulfur. One of the major advantages of using palladium (Pd) based catalysts is the lower cost of Pd compared to Pt. However, Pd-based DOCs typically show higher light-off temperatures for oxidation of CO and HC, especially when used with HC storage materials, potentially causing a delay in HC and or CO light-off. Pd containing DOCs may poison the activity of Pt to convert paraffins and/or oxidize NO and may also make the catalyst more susceptible to sulfur poisoning. These characteristics have typically prevented the use of Pd as an oxidation catalyst in lean burn operations especially for light duty diesel applications where engine temperatures remain below 250° C. for most driving conditions.

Therefore, as emissions regulations become more stringent, there is significant interest in developing diesel oxidation catalysts with improved properties for effective utilization and particularly with improved initial activity, improved thermal stability, controlled and stable metal particle size and reduced aging. The continuing goal is to develop DOC systems including catalyst composites that provide improved light-off performance and removal of residual hydrocarbons, carbon monoxide and $NO_X$. Additionally, as NO emission standards tighten and PGMs become scarce with small market circulation volume, constant fluctuations in price, and constant risk to stable supply, amongst others, there is an increasing need for new compositions for DOC systems which may not require PGM and may be able to maintain effective oxidation of exhaust byproducts and which may exhibit improved catalytic behavior yielding enhanced activity and performance under diesel oxidation condition. There also remains a need for methods of producing such DOC formulations using the appropriate metal loadings of non-PGM material.

According to the foregoing, there may be a need to provide catalytic properties which may significantly depend on catalytically active material compositions to obtain, under some conditions, high dispersion metal components systems for PGM-free catalyst systems which may be manufactured cost-effectively, such that performance of Zero-PGM catalysts may be improved by realizing suitable PGM-free catalytic layers in diesel oxidation catalysis.

SUMMARY

For diesel oxidation catalysts, in a highly dispersed and active form aiming at improving light-off performance, a more effective utilization of PGM-free catalyst materials may be achieved. A plurality of coating process techniques may be employed for the incorporation of catalytically active species onto support oxide materials. A process for coating of sufficient loading may provide improved active sites for catalytic performance. In present disclosure, impregnation technique may be employed to incorporate active catalyst material and to describe important factors which may derive from base metal loadings and their influence on the activity, selectivity, and durability of the catalyst system.

According to embodiments in present disclosure, a diesel oxidation catalyst (DOC) system may include at least a substrate, a washcoat (WC) layer, an overcoat (OC) layer and an impregnation layer. A plurality of catalyst systems may be configured to include an alumina-based WC layer coated on a suitable ceramic substrate, an overcoat layer (OC) layer of support oxide material, such as doped $ZrO_2$, and an impregnation (IMP) layer including Cu—Mn spinel with selected base metal loadings.

According to embodiments in present disclosure, impregnation technique may be used for applying an impregnation (IMP) layer including $Cu_{1.0}Mn_{2.0}O_4$ spinel of selected Cu and Mn loadings on an OC layer of doped $ZrO_2$. In present disclosure, Praseodymium-Zirconium support oxide may be used.

Subsequently, fresh and hydrothermally aged ZPGM DOC system samples may be prepared and undergo testing to measure/analyze light-off performance and/or catalyst activity of the Cu—Mn spinel structure as a DOC.

The DOC standard light-off test may be performed for fresh and hydrothermally aged ZPGM DOC system samples including the Cu—Mn stoichiometric spinel structure employed in present disclosure. Standard light-off test may be performed under steady state condition for catalytic activity in NO, CO, and HC conversions. Analyses of catalytic activity may be developed for fresh and hydrothermally aged ZPGM DOC system samples, including HC and CO light-off temperatures, $T_{50}$, resulting from light-off test procedure employed to verify influence on catalyst activity that may derive from base metal loadings of Cu and Mn to prepare impregnation layer of $Cu_{1.0}Mn_{2.0}O_4$ spinel and to measure NO to $NO_2$ conversion.

It may also be found from present disclosure that although the catalytic activity, and thermal and chemical stability of a catalyst during real use may be affected by factors, such as the chemical composition of the catalyst, the oxidation property of disclosed ZPGM DOC systems may provide an indication that under lean conditions, the chemical composition of disclosed ZPGM DOC system may be more efficient operationally-wise, and from a catalyst manufacturer's viewpoint, an essential advantage given the economic factors involved in using Cu—Mn spinel material compositions.

Numerous other aspects, features, and benefits of the present disclosure may be made apparent from the following detailed description taken together with the drawing figures, which may illustrate the embodiments of the present disclosure, incorporated herein for reference.

BRIEF DESCRIPTION OF THE DRAWINGS

The present disclosure can be better understood by referring to the following figures. The components in the figures are not necessarily to scale, emphasis instead being place upon illustrating the principles of the disclosure. In the figures, reference numerals designate corresponding parts throughout the different views.

DETAILED DESCRIPTION

Figure 1:
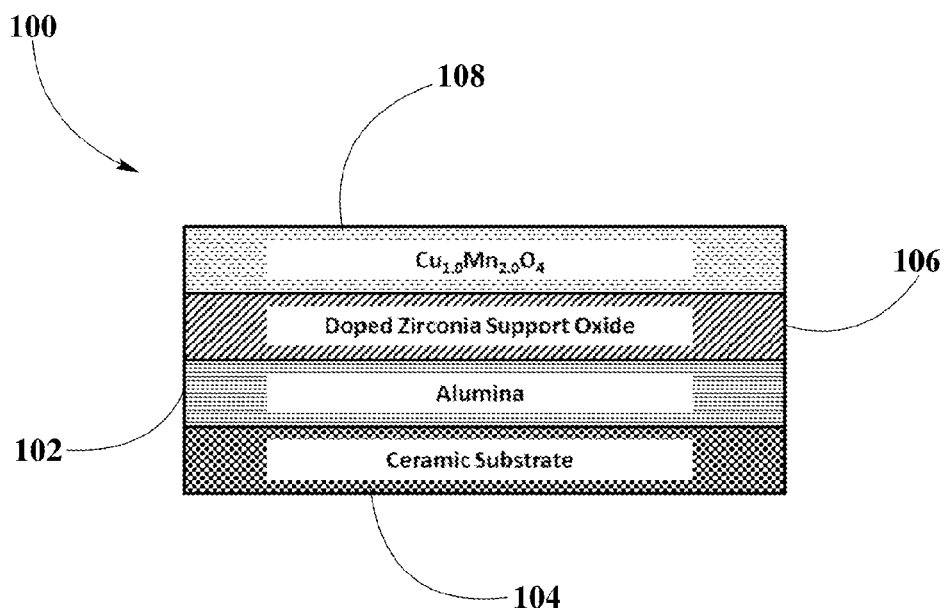
FIG. 1 represents a ZPGM diesel oxidation catalyst (DOC) system configuration for fresh and aged catalyst samples, including alumina-based washcoat on substrate, overcoat with doped $ZrO_2$, and impregnation layer of stoichiometric Cu—Mn spinel of selected base metal loadings, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

DEFINITIONS

As used here, the following terms may have the following definitions:

"Platinum group metal (PGM)" refers to platinum, palladium, ruthenium, iridium, osmium, and rhodium.

"Zero platinum group (ZPGM) catalyst" refers to a catalyst completely or substantially free of platinum group metals.

"Catalyst" refers to one or more materials that may be of use in the conversion of one or more other materials.

"Catalyst system" refers to a system of at least three layers, which may include at least one substrate, a washcoat, and an optional overcoat.

"Diesel oxidation catalyst" refers to a device which utilizes a chemical process in order to break down pollutants from a diesel engine or lean burn gasoline engine in the exhaust stream, turning them into less harmful components.

"Substrate" refers to any material of any shape or configuration that yields a sufficient surface area for depositing a washcoat and/or overcoat.

"Washcoat" refers to at least one coating including at least one oxide solid that may be deposited on a substrate.

"Overcoat" refers to at least one coating that may be deposited on at least one washcoat or impregnation layer.

"Milling" refers to the operation of breaking a solid material into a desired grain or particle size.

"Impregnation" refers to the process of imbuing or saturating a solid layer with a liquid compound or the diffusion of some element through a medium or substance.

"Calcination" refers to a thermal treatment process applied to solid materials, in presence of air, to bring about a thermal decomposition, phase transition, or removal of a volatile fraction at temperatures below the melting point of the solid materials.

"Treating, treated, or treatment" refers to drying, firing, heating, evaporating, calcining, or mixtures thereof.

"Spinel" refers to any of various mineral oxides of magnesium, iron, zinc, or manganese in combination with aluminum, chromium, copper or iron with $AB_2O_4$ structure.

"Conversion" refers to the chemical alteration of at least one material into one or more other materials.

"$T_{50}$" refers to the temperature at which 50% of a material is converted.

"$T_{90}$" refers to the temperature at which 90% of a material is converted.

DESCRIPTION OF THE DRAWINGS

The present disclosure may provide material compositions including stoichiometric Cu—Mn spinel at selected base metal loadings on support oxide and show their influence on light-off performance of diesel oxidation catalyst (DOC) systems to develop suitable catalytic layers, which may ensure high chemical reactivity and thermal and mechanical stability. Aspects that may be treated in present disclosure may show improvements in the process for overall catalytic conversion capacity for a plurality of ZPGM DOC systems which may be suitable for DOC applications.

Configuration, Material Composition, and Preparation of ZPGM Diesel Oxidation Catalyst System As catalyst performance may be translated into the physical catalyst structure, different materials compositions may be formulated and prepared, including stoichiometric Cu—

Mn spinel of different base metal loadings and support oxide materials, to determine the influence of base metal loadings on catalytic performance of disclosed DOC systems.

FIG. 1 shows a catalyst configuration 100 for ZPGM DOC systems, including alumina, $Cu_{1.0}Mn_{2.0}O_4$ spinel of different base metal loadings, and support oxide materials, such as doped Zirconia.

In this configuration washcoat (WC) layer 102 may be doped aluminum oxide, zirconium oxide, doped Zirconia, titanium oxide, tin oxide, silicon dioxide, zeolite, and mixtures thereof, which may be prepared employing a suitable coating process, as known in the art, according to an embodiment. In present disclosure WC layer 102 may preferably be an alumina-based washcoat, coated on suitable substrate 104, which may include a refractive material, a ceramic material, a honeycomb structure, a metallic material, a ceramic foam, a metallic foam, a reticulated foam, or suitable combinations. Substrate 104 may have a plurality of channels with suitable porosity. Porosity may vary according to the particular properties of substrate 104 materials. Additionally, the number of channels may vary depending upon substrate 104 and its type and shape may be apparent to one of ordinary skill in the art. According to the present disclosure, preferred substrate 104 may be a ceramic substrate.

Overcoat (OC) layer 106 for ZPGM DOC systems may include material oxides, such as doped aluminum oxide, zirconium oxide, doped Zirconia, titanium oxide, tin oxide, silicon dioxide, zeolite, and mixtures thereof. In present disclosure, disclosed OC layer 106 may preferably include doped Zirconia.

Impregnation technique may be used for applying an impregnation (IMP) layer 108 of $Cu_{1.0}Mn_{2.0}O_4$ spinel of different base metal loadings on OC layer 106 of doped Zirconia, which may be coated on alumina-based WC layer 102 on ceramic substrate 104. In present disclosure IMP layer 108 including $Cu_{1.0}Mn_{2.0}O_4$ spinel of selected based metal loadings may be applied on OC layer 106 of $Pr_6O_{11}$—$ZrO_2$ support oxide, coated on alumina-based WC layer 102 on ceramic substrate 104.

The effect of selected base metal loadings of Cu—Mn may be verified preparing fresh and hydrothermally aged ZPGM DOC system samples, according to catalyst formulation in present disclosure, which may be tested under light-off conditions. The Cu—Mn spinel structure may play an important role in modifying the surface concentration and selectivity enhancing the activity of the support oxide to ensure hydrothermal stability up to high operating temperatures.

DOC Standard Light-Off Test Procedure

DOC standard light-off test under steady state condition may be performed employing a flow reactor in which temperature may be increased from about 100° C. to about 500° C. at a rate of about 40° C./min, feeding a gas composition of about 100 ppm of $NO_X$, 1,500 ppm of CO, about 4% of $CO_2$, about 4% of $H_2O$, about 14% of $O_2$, and about 430 ppm of $C_3H_6$, at space velocity (SV) of about 54,000 $h^{-1}$.

The following examples are intended to illustrate the scope of the disclosure. It is to be understood that other procedures known to those skilled in the art may alternatively be used. Examples in the present disclosure may be prepared according to the DOC system configuration previously disclosed.

EXAMPLES

Example #1

ZPGM DOC Sample Including $Cu_{1.0}Mn_{2.0}O_4$ Spinel

Example #1 may illustrate preparation of fresh samples of ZPGM DOC system having catalyst configuration 100.

Preparation of ZPGM DOC system fresh samples of catalyst configuration 100 may employ a coating process including impregnation technique for IMP layer 108 of $Cu_{1.0}Mn_{2.0}O_4$ spinel, on OC layer 106 of $Pr_6O_{11}$—$ZrO_2$ support oxide.

Preparation of WC layer 102 may start by milling alumina solution to make slurry. Suitable loading of alumina may be about 120 g/L. Alumina slurry may be subsequently coated on ceramic substrate 104 and fired (calcined) at about 550° C. for about 4 hours. Preparation of OC layer 106 may start by milling $Pr_6O_{11}$—$ZrO_2$ support oxide with water separately to make slurry. Suitable loading of $Pr_6O_{11}$—$ZrO_2$ support oxide may be about 120 g/L. Then, OC layer 106 may be coated on WC layer 102, followed by calcination at 550° C. for about 4 hours. Subsequently, for $Cu_{1.0}Mn_{2.0}O_4$ spinel, Cu—Mn solution may be prepared by mixing the appropriate amount of Mn nitrate solution ($Mn(NO_3)_2$) and Cu nitrate solution ($CuNO_3$) with water to make solution at appropriate molar ratio for $Cu_{1.0}Mn_{2.0}O_4$. Then, Cu—Mn solution may be impregnated to OC layer 106, followed by firing at about 600° C. for about 5 hours.

The DOC activity for fresh ZPGM DOC system samples may be determined by performing DOC standard light-off test from about 100° C. to about 500° C., and testing a gas stream at SV of about 54,000 $h^{-1}$ to measure the CO, $NO_X$, and HC conversions.

ZPGM DOC system samples may be subsequently hydrothermally aged employing about 10% steam/air at a plurality of temperatures within a range from about 700° C. to about 900° C. for about 5 hours. In this embodiment, all samples may be preferably hydrothermally aged at about 750° C. for about 5 hours.

The DOC activity for hydrothermally aged ZPGM DOC system samples may be determined by performing DOC standard light-off test from about 100° C. to about 500° C., and testing a gas stream at SV of about 54,000 $h^{-1}$ to measure the CO, $NO_X$, and HC conversions.

Figure 2:
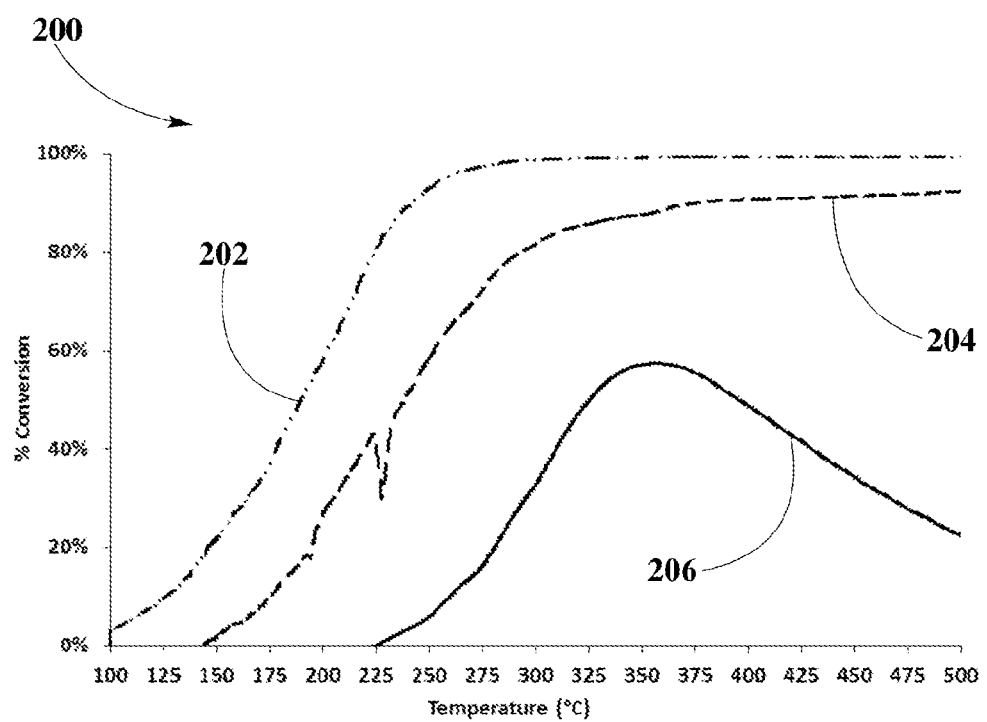
FIG. 2 depicts DOC activity for fresh ZPGM system samples prepared by impregnation of stoichiometric Cu—Mn spinel of selected base metal loadings, under steady state DOC light-off condition within a temperature range of about 100° C. to about 500° C. and space velocity (SV) of about 54,000 $h^{-1}$, according to an embodiment.

Analysis of Influence of $Cu_{1.0}Mn_{2.0}O_4$ Spinel on DOC Activity of Fresh ZPGM DOC System Samples FIG. 2 depicts DOC activity 200 for fresh ZPGM DOC system samples prepared by impregnation of stoichiometric Cu—Mn spinel of selected base metal loadings, under steady state DOC light-off condition from about 100° C. to about 500° C. and space velocity (SV) of about 54,000 h–1, according to an embodiment.

In FIG. 2, conversion curve 202 (double dot-long dash line) shows CO conversion for fresh ZPGM sample; conversion curve 204 (long dash line) represents HC conversion for fresh ZPGM sample; conversion curve 206 (solid line) depicts NO conversion for fresh ZPGM sample.

As may be seen in FIG. 2, $T_{50}$ of CO and HC oxidation are about 180° C. and about 235° C., respectively. Additionally, CO and HC rapidly reach to 90% conversion, $T_{90}$, at about 230° C. for CO oxidation and about 375° C. for HC oxidation, showing that Cu—Mn spinel, as active phase of oxidation catalyst, is rapidly providing desirable levels of CO and HC conversion at relatively low temperatures, which also indicates the effectiveness of the catalytic components in present disclosure.

It is detected that NO oxidation to $NO_2$ gradually increases with temperature reaching a maximum level of about 57% at about 350° C. where CO conversion is about 99% and HC conversion is about 88%. As seen, oxidation of NO, CO and HC shows low light-off temperatures and above 50% NO conversion level in absence of any PGM compounds which denote that ZPGM DOC samples including IMP layer 108 of $Cu_{1.0}Mn_{2.0}O_4$ spinel may be suitable for an oxidation catalyst in lean burn operations especially for light duty diesel applications.

Figure 3:
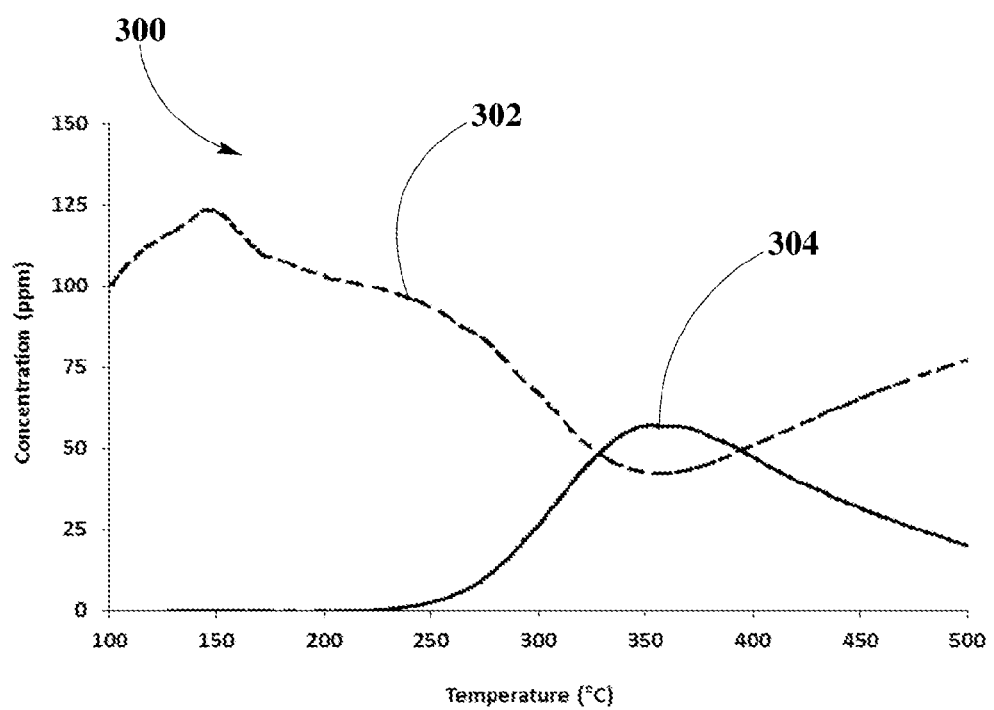
FIG. 3 illustrates oxidation of NO to $NO_2$ for fresh ZPGM system samples prepared by impregnation of stoichiometric Cu—Mn spinel of selected base metal loadings, under steady state DOC light-off condition within a temperature range of about 100° C. to about 500° C. and space velocity (SV) of about 54,000 $h^{-1}$, according to an embodiment.

FIG. 3 illustrates oxidation of NO to NO2 300 for fresh ZPGM DOC system samples prepared by impregnation of stoichiometric Cu—Mn spinel of selected base metal loadings, under steady state DOC light-off condition and space velocity (SV) of about 54,000 $h^{-1}$, according to an embodiment.

In FIG. 3, concentration profile curve 302 (long dash line) illustrates NO concentration and concentration profile curve 304 (solid line) represents $NO_2$ concentration for fresh ZPGM sample.

As may be seen in FIG. 3, fresh ZPGM sample, shows formation of $NO_2$. As noted, in concentration profile curve 302, from an inlet NO concentration of 100 ppm, when temperature increases NO concentration increases to about 125 ppm and then rapidly decreases with temperature. The increase of NO concentration at the beginning is because of the ability of ZPGM catalyst to store NO at very low temperature, less than 100° C., and then release of NO when temperature goes above 100° C. Decreasing NO concentration is consistent with formation of $NO_2$. $NO_X$ concentration continues to decrease with temperature to reach a minimum of about 42.7 ppm when $NO_2$ concentration produced from oxidation of NO reach to 56.90 ppm, which is consistent with maximum conversion of NO, 57%, at about 350° C. according to FIG. 2.

As may be seen from FIG. 2 and FIG. 3, ZPGM sample having the Cu—Mn spinel as the only active phase has great oxidation property for NO, CO, and HC. The level of activity observed may be attributed to the composition of the Cu—Mn spinel and the preparation method using the impregnation technique and base metal loadings.

Figure 4:
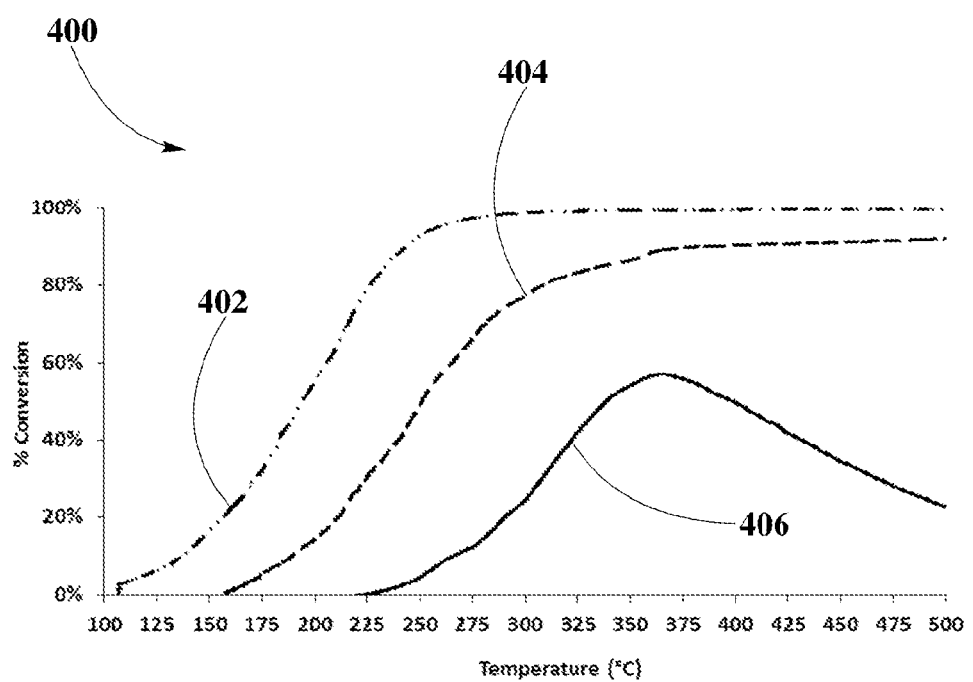
FIG. 4 shows DOC activity for hydrothermally aged ZPGM system samples prepared by impregnation of stoichiometric Cu—Mn spinel of selected base metal loadings, under steady state DOC light-off condition within a temperature range of about 100° C. to about 500° C. and space velocity (SV) of about 54,000 $h^{-1}$, according to an embodiment.

Analysis of Influence of $Cu_{1.0}Mn_{2.0}O_4$ Spinel on DOC Activity of Hydrothermally Aged ZPGM DOC System Samples FIG. 4 shows DOC activity 400 for hydrothermally aged ZPGM samples prepared by impregnation of stoichiometric Cu—Mn spinel of selected base metal loadings, under steady state DOC light-off at space velocity (SV) of about 54,000 $h^{-1}$, according to an embodiment.

In FIG. 4, conversion curve 402 (double dot-long dash line) shows CO conversion for hydrothermally aged ZPGM samples; conversion curve 404 (long dash line) represents HC conversion for hydrothermally aged ZPGM samples; conversion curve 406 (solid line) depicts NO conversion for hydrothermally aged ZPGM samples.

As may be seen in FIG. 4, $T_{50}$ of CO and HC oxidation are about 190° C. and about 250° C., respectively. Additionally, CO and HC rapidly reach to 90% conversion, $T_{90}$, at about 250° C. for CO oxidation and about 400° C. for HC oxidation showing thermal stability of Cu—Mn active phase as oxidation catalyst.

It is detected that NO oxidation to $NO_2$ gradually increases with temperature reaching a maximum level of about 57% at about 362° C., where CO conversion is about 99.4% and HC conversion is about 88.8%. As seen, oxidation of NO, CO and HC shows low light-off temperatures and above 50% NO conversion level in absence of any PGM compounds, which denotes that ZPGM DOC samples including IMP layer 108 of $Cu_{1.0}Mn_{2.0}O_4$ spinel may be suitable for an oxidation catalyst in lean burn operations especially for light duty diesel applications.

It may be noted in FIG. 4 that even the degree of deactivation of Cu—Mn spinel active phase after hydrothermal aging is not significant. By comparing degree of oxidation of CO, HC, and NO for fresh ZPGM samples (FIG. 2) and hydrothermally aged ZPGM samples (FIG. 3), it may seen that $T_{50}$ of CO and $T_{50}$ of HC increased only 10° C. and 15° C., respectively, after hydrothermal aging of ZPGM sample while the temperature of maximum NO conversion only increased 12° C. with same NO oxidation level. This is indicative that hydrothermally aged ZPGM DOC system samples presents a significant oxidation behavior for utilization of Cu—Mn spinel as an effective and stable diesel oxidation active phase.

It may also be found from present disclosure that although the catalytic activity, and thermal and chemical stability of a catalyst during real use may be affected by factors, such as the chemical composition of the catalyst, the oxidation property of disclosed ZPGM DOC systems may provide an indication that under lean conditions, the chemical composition of disclosed ZPGM DOC system may be more efficient operationally-wise, and from a catalyst manufacturer's viewpoint, an essential advantage given the economic factors involved in using Cu—Mn spinel material compositions. The hydrothermally aged ZPGM catalyst samples may be as active as fresh catalyst samples for NO, CO and HC oxidation for DOC applications.

While various aspects and embodiments have been disclosed, other aspects and embodiments may be contemplated. The various aspects and embodiments disclosed here are for purposes of illustration and are not intended to be limiting, with the true scope and spirit being indicated by the following claims.

What is claimed is:

1. A method for improving the performance of catalytic systems comprising a catalyst, comprising:
   providing at least one ceramic-based substrate;
   depositing a washcoat suitable for deposition on the substrate;
   depositing an overcoat overlying said washcoat, the overcoat comprising at least one support oxide material comprising $ZrO_2$; and
   depositing at least one impregnation layer overlying the overcoat;
   wherein one of the at least one impregnation layer comprises Cu—Mn spinel.

2. The method of claim 1, wherein the washcoat may be doped with at least one selected from the group consisting of aluminum oxide, zirconium oxide, doped Zirconia, titanium oxide, tin oxide, silicon dioxide, zeolite, and mixtures thereof.

3. The method of claim 1, wherein the overcoat may comprise at least one material oxide selected from the group consisting of doped aluminum oxide, zirconium oxide, doped Zirconia, titanium oxide, tin oxide, silicon dioxide, zeolite, and mixtures thereof.

4. The method of claim 1, wherein at least a portion of the Cu—Mn spinel has a general formula of $Cu_{1.0}Mn_{2.0}O_4$.

5. The method of claim 1, wherein the catalyst exhibits a T50 of CO that is about 180° C.

6. The method of claim 1, wherein the catalyst exhibits a T50 of HC that is about 235° C.

7. The method of claim 1, wherein the catalyst exhibits a conversion of NO that is greater than 55% at about 350° C.

8. The method of claim 1, wherein the catalyst exhibits a T50 of CO increases less than 15° C. after hydrothermal aging at 750° C.

9. The method of claim 1, wherein the catalyst exhibits a T50 of NO increases less than 15° C. after hydrothermal aging at 750° C.

10. The method of claim 1, wherein the catalyst exhibits a T50 of HC increases less than 15° C. after hydrothermal aging at 750° C.

11. The method according to claim 1, wherein the washcoat is heated for about 2 to about 6 hours.

12. The method according to claim 1, wherein the washcoat is heated for about 4 hours.

13. The method according to claim 1, wherein the washcoat is heated to greater than 300° C.

14. The method according to claim 1, wherein the substrate has about 100 cells per square inch.

15. The method according to claim 1, wherein the substrate comprises metal.

16. The method according to claim 1, wherein the washcoat further comprises at least one oxygen storage material.

17. The method according to claim 1, wherein the catalyst exhibits a T50 for hydrocarbon conversion that is about 339° C.

18. The method according to claim 1, wherein the catalyst exhibits a T50 for hydrocarbon conversion that is about 336° C.

19. The method according to claim 1, wherein the catalyst exhibits a T50 for hydrocarbon conversion that is about 357° C.

20. The method according to claim 1, wherein the catalyst exhibits a T50 for carbon monoxide conversion that is about 200° C.

21. The method according to claim 1, wherein the support oxide of the overcoat comprises $Pr_6O_{11}$—$ZrO_2$.

* * * * *

UNITED STATES PATENT AND TRADEMARK OFFICE
CERTIFICATE OF CORRECTION

PATENT NO. : 9,486,783 B2  
APPLICATION NO. : 14/251186  
DATED : November 8, 2016  
INVENTOR(S) : Nazarpoor Page 1 of 1

It is certified that error appears in the above-identified patent and that said Letters Patent is hereby corrected as shown below:

On the Title Page

Item (73) Assignee: "Clean Diesel Technologies, Inc. (CDTI), Oxnard, CA (US)" should read --Clean Diesel Technologies, Inc., Oxnard, CA (US)--.

Signed and Sealed this  
Eighteenth Day of July, 2017

Joseph Matal  
*Performing the Functions and Duties of the*  
*Under Secretary of Commerce for Intellectual Property and*  
*Director of the United States Patent and Trademark Office*